United States Patent [19]

Edwards

[11] Patent Number: 4,896,771

[45] Date of Patent: Jan. 30, 1990

[54] CIRCULAR SAW BLADE CASE

[76] Inventor: Louie M. Edwards, 10207 Morgan Territory Rd., Livermore, Calif. 94550

[21] Appl. No.: 387,865

[22] Filed: Jul. 31, 1989

[51] Int. Cl.⁴ .............................................. B65D 85/00
[52] U.S. Cl. .................................... 206/349; 206/445; 206/372
[58] Field of Search ............... 206/445, 349, 303, 310, 206/372

[56] References Cited

U.S. PATENT DOCUMENTS

| | | | |
|---|---|---|---|
| 483,991 | 3/1892 | Chase | 206/349 |
| 1,500,136 | 9/1924 | Knowlton | 206/349 |
| 2,030,465 | 2/1936 | Nist | 206/303 X |
| 2,459,460 | 9/1949 | Segal | 206/349 |
| 2,695,210 | 5/1954 | Evans | 206/349 |
| 3,053,424 | 2/1962 | Reinhard | 206/303 |
| 3,259,231 | 1/1966 | Romanowski et al. | 206/349 |
| 3,261,454 | 9/1966 | Elson | 206/349 |
| 3,339,781 | 9/1967 | Schurman et al. | 206/349 X |
| 3,719,271 | 3/1973 | Authier et al. | 206/445 X |
| 3,870,148 | 11/1975 | Hite | 206/309 |
| 3,913,735 | 10/1975 | Durbin | 206/303 |
| 4,253,571 | 3/1981 | Keohan | 206/445 X |
| 4,415,080 | 11/1983 | Romine et al. | 206/349 |
| 4,588,082 | 6/1986 | Ridings | 206/349 |
| 4,611,713 | 9/1986 | Byrns | 206/303 X |
| 4,784,263 | 4/1988 | Stanley | 206/445 |

Primary Examiner—William Price

[57] ABSTRACT

This invention provides a hinged, one-piece case for protecting and storing a plurality of circular saw blades. The case comprises a bottom section with a central threaded spindle for receiving saw blades and a cover section which accepts the spindle and releasably snap-locks onto the bottom section to form a watertight case. Blades are held firmly in place by the use of a wing nut threaded onto the spindle. A handle is integrally molded into the bottom section. The case is of simple, lightweight, and inexpensive construction, and stackable for marketing and storage purposes.

8 Claims, 2 Drawing Sheets

CIRCULAR SAW BLADE CASE

TECHNICAL FIELD

This invention relates in general to a protective tool case and in particular to a case for circular saw blades.

In the carpentry trade circular saw blades must be kept in good working condition, in adequate supply, and readily available. Saw blades need to be protected against corrosion, primarily from exposure to the elements, and against physical damage, which can tend to dull and shorten the lifespan of the blade. Because of their weight and sharp nature, circular saw blades require the safest and most convenient transport and storage means possible. There are, however, currently no circular saw blade carrier products on the market, suggesting that these requirements have not yet been met.

DESCRIPTION OF THE PREVIOUS ART

A number of saw blade carrying devices are present in the patent literature, indicating a recognized need for a means to protect and carry circular saw blades. The earliest patents were designed to contain only one saw blade. The patent by Chase (U.S. Pat. No. 483,991) relates to a packing case for a single blade molded from pressed pulp, and Knowlton (U.S. Pat. No. 1,500,136) presents a wood frame fitted together to form an open, flat frame for a single blade. Segal (U.S. Pat. No. 2,459,460) shows a case for the shipping and/or storage of circular saw blades having carbide tipped teeth by confining the blades between two sheets of Masonite and clamped on opposite sides of the saw by a single bolt through the center. Romanowski et al. (U.S. Pat. No. 3,259,231) discloses a plastic display and storage casing for a circular saw blade having two plastic circular discs with a central hub, and designed to hang on a rod for display.

Evans (U.S. Pat. No. 2,695,210), Elson (U.S. Pat. No. 3,261,454), and Hite (U.S. Pat. No. 3,870,148) all provide storage inside portable tool boxes. The Evans patent describes a hinged tool carrying case for portable power tools such as a circular saw. However, there is no accomodation for securing saw blades within the case other than the blade in the saw itself. Elson discloses a saw blade holder for use in conjunction with a kit box for carrying a saw, wherein the saw blades are secured to the lid of the box on a central screw by means of a wing nut. Hite provides a circular saw blade conveyance box for a plurality of circular saw blades in the form of a rectangular case with a hingable cover. The blades rest within compartments formed by separator inserts, however there is no constraint to prevent free movment of the blades within each compartment.

Reinhard (U.S. Pat. No. 3,053,424) discloses a carrier for circular saw blades which secures the blades between two end plates. The open sides, however, expose the blades to the elements and to possible physical damage. Another example of blades exposed to the elements is seen in a patent by Ridings (U.S. Pat. No. 4,588,082), who describes a circular sawblade packaging case formed by a single plastic sheet with living hinges at two places resulting in open sides.

The circular saw blade carrier described by Stanley (U.S. Pat. No. 4,784,263) is formed of a dome-shaped cover member having a cylindrical body, the end of which fits onto a base, with a central threaded spindle mounted onto the base. A large, square handle is used to rotate the cover on or off of the threaded spindle, on which a plurality of blades can be placed. Although the carrier is waterproof and can carry a number of blades, if the cylindrical carrier was on its side, the blades could move within the carrier possibly causing physical damage to the blades, especially if the carrier rolled. In addition, the cylindrical shape with a top handle makes the carrier difficult to stack for marketing and storage purposes.

All of the previous art has one or more deficiency which can be improved by the present invention. Not many of the inventions mentioned offer a carrier which is both watertight and can hold a plurality of blades. Of those that do, constraint of the blades to protect against physical damage from movement within the carrier is not adequately addressed. Neither are they of a construction that may be economically manufactured and marketed in the most convenient storage carrier possible.

SUMMARY OF THE INVENTION

It is the purpose of the present invention to provide a progressive circular saw blade case which overcomes the problems of the previous art and offers features to optimize production and marketing of a safe and convenient saw blade case.

It is the primary object of this invention to protect a plurality of saw blades from the elements and physical damage by enclosing them in a watertight case which is adapted to eliminate free movement.

It is also an object of this invention to provide such a case which is the most convenient to use, while providing safety for the user.

A further object is to provide such a case which is of simple, lightweight, and inexpensive construction, and stackable to facilitate both marketing and storage.

In fulfillment and implementation of these objects, this invention provides a hinged one-piece case, comprising a bottom section, which has a central threaded spindle for receiving a plurality of circular saw blades, and a cover section with means to accept the spindle and fit together with the bottom in a snap-lock releasable closure, providing a watertight case. In the bottom section, the blades rest on a pedestal at the base of the spindle, with the generally square shape of the case allowing finger space to safely access the blades. The blades can be held firmly in place by threading a wing nut over the spindle until it rests against the blades. A carrying handle is integrally molded into the front edge of the bottom of the case, and the cover section is hinged to the bottom at the opposite end of the case. The cover contains a central indentation to easily accept and hold the central spindle when the case is closed. The case is pulled open by a finger grip on peripheral flanges on the cover and bottom sections and is releasably snap-locked by hand pressure to the cover of the case.

The one-piece integral construction of the case, preferably formed of a tough engineering plastic, limits losable parts or extra hardware fittings except for a single easily replaceable wing nut, and provides a durable, economical, watertight, lightweight, convenient, easily portable and stackable case.

DETAILED DESCRIPTION OF THE INVENTION

Figure 1:
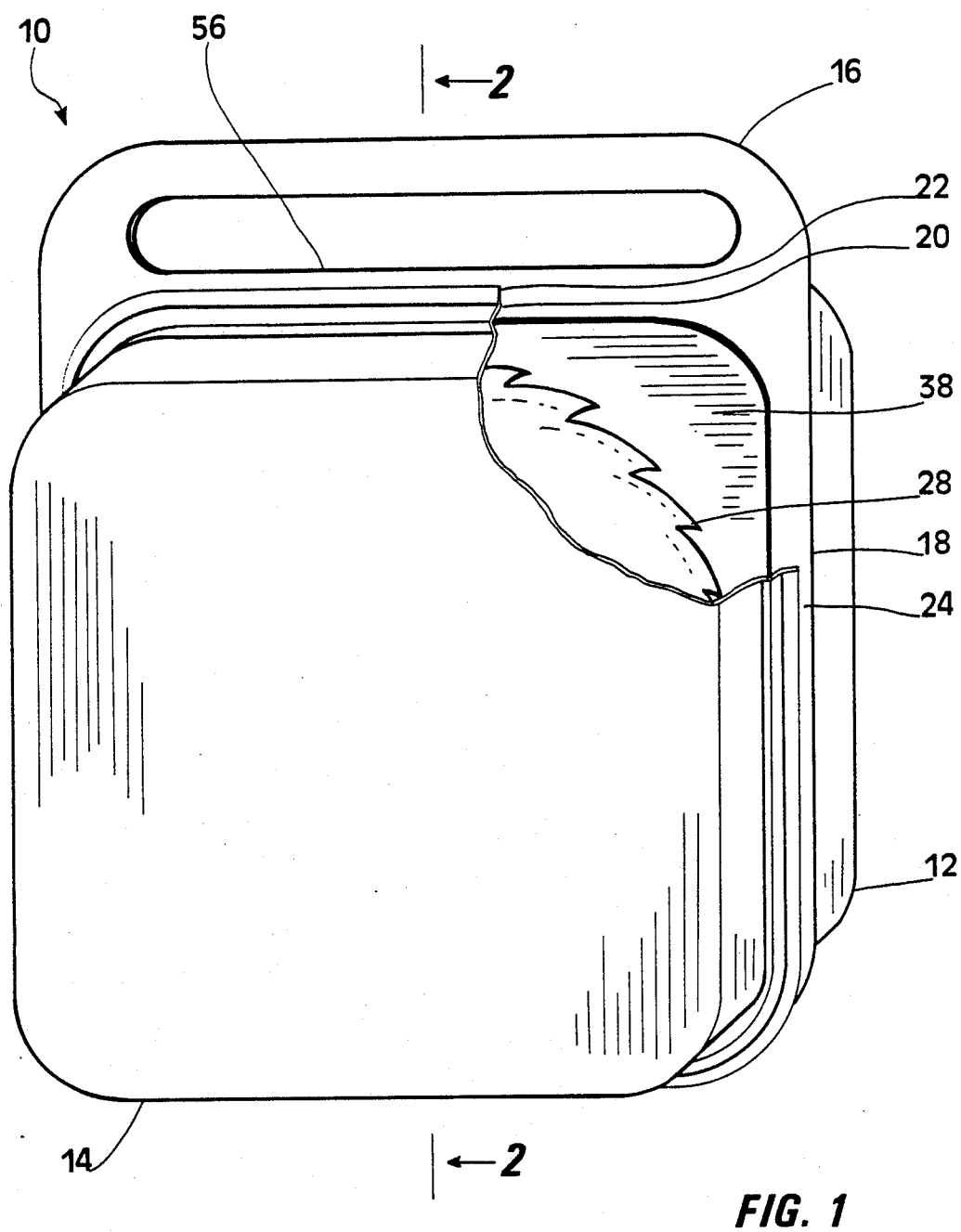
FIG. 1 is perspective view, partially broken away, of a circular saw blade case in accordance with the present invention.
Figure 2:
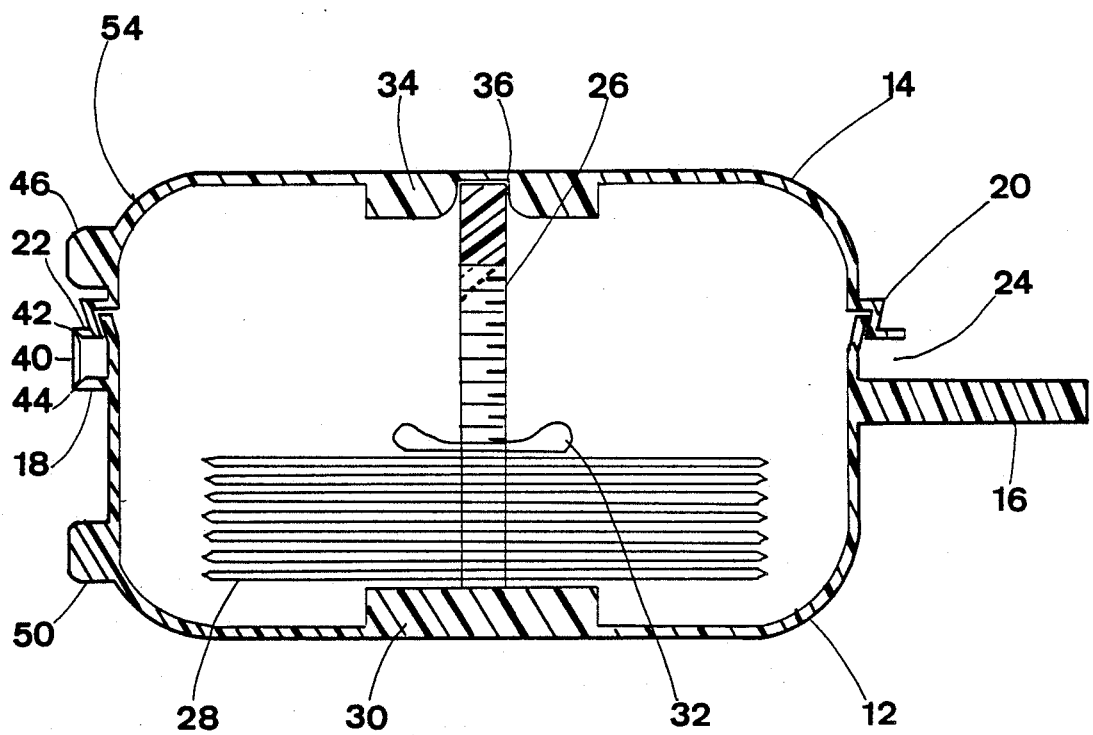
FIG. 2 is a cross-sectional view taken along the line 2—2 of FIG. 1.

As shown in FIGS. 1 and 2, a circular saw blade case 10 embodying the present invention is integrally thermoformed from synthetic plastic material providing a bottom section 12 and a cover section 14. The bottom section 12 includes a flange 18 surrounding it which extends on the front end 56 to incorporate a handle 16 as an integral part of the case 10, and is located so that the handle is in a central position when the case 10 is closed. The cover section 14 contains a peripheral lip 20 and flange 22 cooperatively dimensioned and configured so that the cover section 14 releasably interlocks with the bottom section 12 in a snap-lock closure, with a space 24 left between the flanges 18 and 22 allowing finger access to disengage the cover section 14 from the bottom section 12. Corners of the square case 10 are rounded to augment the functional engagement of the closure, while still allowing finger space 38 around the circular saw blades 28 to safely lift them in and out of the bottom section 12.

Centrally located in the bottom section 12 is a threaded spindle 26 on which saw blades 28 are retained. Surrounding the spindle 26 is a short, cylindrical pedestal 30 integrally molded into the bottom section 12 to support the blades 28, and to prevent direct contact of the blades 28 with the bottom section 12, and to safely access the blades 28. Blades 28 are held firmly in place on the spindle 26 with a wing nut 32 which can be threaded onto the spindle 26 until the nut 32 comes into contact with the blades 28 on the pedestal 30. Centrally located and molded into the cover section 14 is a short cylindrical boss 34 with an aperture 36 formed to readily receive and secure the spindle 26 when the case 10 is closed.

Figure 3:
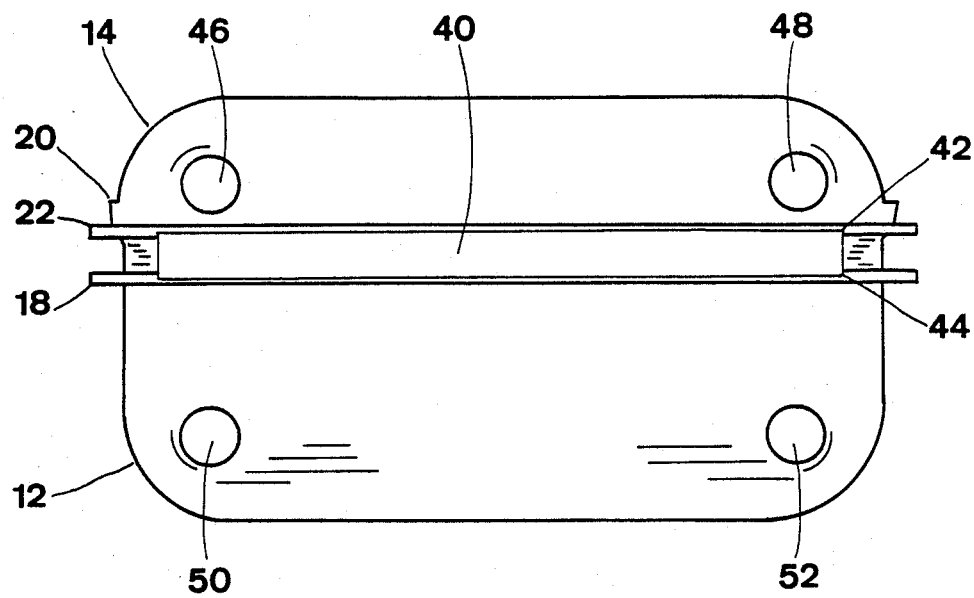
FIG. 3 is a rear end view of the saw blade case.

FIG. 3 illustrates the elongated integral hinge 40 connecting the bottom section 12 and cover section 14 at the rear end 54 of the case 10. The internal hinge 40 extends between adjacent margins of the flanges 18 and 22, thereby forming the joints 42 and 44 of the hinge 40. Also molded into the rear end 54 of the case 10 are four dome-shaped buttons 46, 48, 50, and 52 which extend beyond the distance of the flanges 18 and 22 and hinge 40, and are placed symetrically to balance the case 10 on its end 54 with the handle 16 in an upright position.

In use, the hinged case 10 is pulled open by a finger grip on the flange 22 of the cover section 14 to disengage it from the bottom section 12. Once the saw blades 28 are placed on the spindle 26 and secured with the wing nut 32 the case 10 is closed and snap-locked with hand pressure to the cover section 14.

As will be readily appreciated, the case of the present invention may be fabricated from synthetic thermoplastic material by conventional thermoforming techniques. Various thermoplastics may be employed including polyvinyl chloride, which has been found advantageous in providing a reasonable balance of properties at relatively low cost.

Thus it can be seen that the present invention provides a case to protect a plurality of saw blades from physical damage due to exposure to the elements or adverse movement. Furthermore the saw blade case has the additional advantage in that:

it provides a one-piece case of simple, lightweight and inexpensive construction;

it provides a stackable shape to facilitate both marketing and user storage;

it allows the convenience of a snap-lock releasable closure with an easily managed fastener to secure the blades.

In addition to the preferred embodiment described, many other variations are possible, including size differences in the case to accomodate different sizes of saw blades; the use of plastic separator disks to place between used and new or sharp and dull blades; the addition of means to attach a saw blade tool within the cover section; and variations in the type of hinge in accordance with the one-piece design of the invention.

Accordingly, the appended claims and their legal equivalents should determine the scope of the invention, rather than the embodiment illustrated.

Having thus described the invention, what is claimed is:

1. A hinged, one-piece, generally square case for circular saw blades integrally formed from synthetic plastic material and comprising:
   a bottom section having a central spindle and means to receive a cover section;
   a spindle having threads on the upper end and means of support in said bottom section at the lower end;
   a handle integrally molded into said bottom section;
   a cover section having a central cylindrical boss with an aperture for receiving said spindle and means to accept said bottom section to form a watertight case.

2. A case according to claim 1 in which said cover section contains a lip for accepting said bottom section in a snap-lock releasable closure, and a peripheral flange on said lip of sufficient size to allow leverage of said cover section with fingers when said bottom and cover sections meet in said closure.

3. A case according to claim 2 in which said bottom section has a flange of sufficient size and distance from the top of said bottom section to allow leverage with fingers when said bottom and cover sections meet in said closure.

4. A case according to claim 3 in which all corners have been rounded to a degree which allow said closure as well as finger space around circular saw blades placed on said spindle to permit removal by hand.

5. A case according to claim 3 further including said handle as an integral extension of said flange, said flange being placed at a distance from said top of bottom section so that said handle is centrally located when said case is placed in an upright position.

6. A case according to claim 5 in which said hinge connects said flanges of said bottom and cover sections at the rear end of said case opposite said handle.

7. A case according to claim 6 in which a plurality of dome-shaped buttons are placed on said rear end of case to balance it in an upright position.

8. A one-piece case for circular saw blades integrally thermoformed from synthetic plastic material comprising in combination:
   a. a bottom section having a central threaded spindle for receiving circular saw blades, said spindle being surrounded and supported by a central cylindrical pedestal on which said blades rest, a wing nut threaded onto said spindle to secure said blades on said pedestal, a flange of sufficient size and distance from the top of said bottom section to allow a finger grip, a handle integrally molded onto the front of said case as an extension of said flange, said flange being placed at a distance from said top of bottom section so that said handle is centrally located when said case is placed in an upright position, and means to accept a cover section to form a watertight case;

b. a cover section including a central cylindrical boss with an aperture for receiving and securing said spindle, a peripheral lip for accepting said bottom section in a snap-lock releasable closure, and a peripheral flange on said lip of sufficient size to allow leverage of said cover section with fingers when said bottom and cover sections meet in said closure;

c. snap-lock releasable closure means on said cover and bottom sections, said case being of generally square configuration with all corners being rounded to a degree which allow said closure as well as finger access to said circular saw blades;

d. a self-hinging connection extending between adjacent margins of said flanges of said bottom and cover sections, said handle and said hinge extending from opposed ends of said case.

* * * * *